MAGNETIC RECORDING SENSING MEANS

Filed Nov. 4, 1957 4 Sheets-Sheet 1

INVENTORS
EVON C. GREANIAS
YATES M. HILL
BY Francis V. Giolma
ATTORNEY

MAGNETIC RECORDING SENSING MEANS

Filed Nov. 4, 1957 4 Sheets-Sheet 2

United States Patent Office 3,012,233
Patented Dec. 5, 1961

3,012,233

MAGNETIC RECORDING SENSING MEANS

Evon C. Greanias, Vestal, and Yates M. Hill, Endicott, N.Y., assignors to International Business Machines Corporation, New York, N.Y., a corporation of New York Filed Nov. 4, 1957, Ser. No. 694,159
9 Claims. (Cl. 340—174.1)

Figure 1:
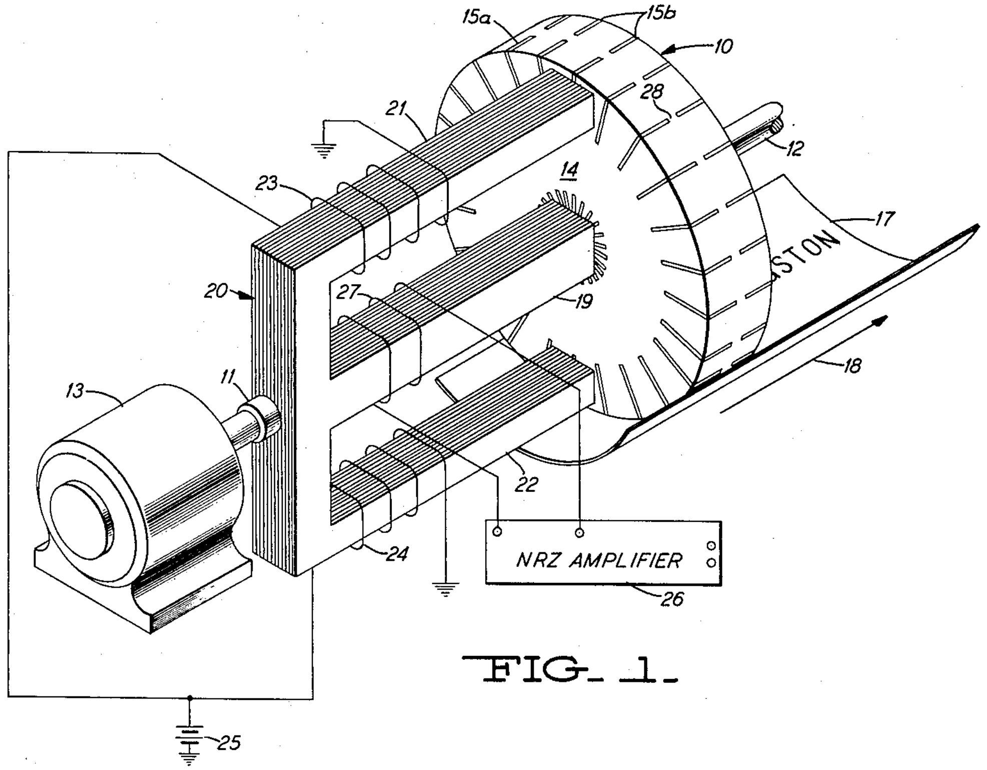

This invention relates generally to the sensing of magnetically recorded characters, and in particular to an improved sensing means for scanning characters which are defined by magnetizable areas for the purpose of determining the nature of the characters.

More particularly this invention relates to a rotary scanning device for sensing magnetic characters for analyzing purposes.

The scanning of magnetizable areas on a recording medium by successively scanning the area in a direction transverse to the direction of motion of a character bearing medium has, in the prior art, been accomplished by the use of magnetic influence devices or reading heads which are arranged to be swept across the medium, usually by rotation of a suitable wheel or drum to which the heads are attached, so that electrical signals are induced in windings associated with the heads. These signals are then supplied by way of slip rings and/or commutating devices which afford an electrical connection between the stationary utilization devices to which the signals are supplied, and the rotary pick-up head where the signals are generated. If a relatively large number of scans are to occur within a relatively short interval of time, it is necessary either to rotate a single pick-up head at a relatively high speed, or to provide a plurality of rotating heads revolving at a lower speed and having a plurality of electrical connections thereto, both arrangements having disadvantages.

The subject invention provides an improved rotary magnetic character scanning device in which no commutator or slip ring construction for electrical signals is necessary, and in which a relatively large number of scans may be accomplished for each revolution of the rotary scanning head or element.

Briefly described, the invention contemplates a normally balanced magnetic circuit including means for creating a magnetic flux therein, and having air gaps which are included in the structure of a rotary scanning element. The magnetic areas to be scanned are traversed by the path swept through by the air gaps as the scanning element rotates. When no magnetizable areas are in the vicinity of the scanning path, a flux balance is established in the magnetic circuit. When a magnetizable area is scanned by the rotating air gaps, unbalances are created in the magnetic circuit, and the resulting differential flux changes are utilized to induce output signals in a winding associated with the magnetic circuit. Since these signals are produced in the predetermined relation to the configuration of the character being scanned, they may be used in analyzing the nature of the character.

It is one object of this invention to provide a new and novel rotary scanner that is simple and inexpensive to manufacture, and is reliable in operation.

More specifically it is an object of this invention to provide in a magnetic recording sensing device for utilizing changes in magnetic flux in a normally balanced magnetic circuit for detecting characters of a magnetic medium.

It is also an object of this invention to provide for successively bringing a plurality of magnetic circuits having air gaps into proximity with characters of a magnetizable medium and into position in a balanced magnetic circuit for effecting energization of an output circuit in accordance with an unbalance in the previously balanced circuit.

Yet another object of this invention is to provide in a magnetic character scanning device for utilizing in sequence a plurality of magnetizable elements with a balanced magnetic drive circuit for determining the nature of the characters by unbalances produced in the magnetic circuit by the proximity of the magnetizable characters to different ones of the elements.

It is also an object of this invention to provide in a magnetizable character sensing device for utilizing each of a plurality of magnetic gap elements alternately as a character sensing element and as a comparison standard.

Another important object of this invention is to provide for inducing differential output signals in a stationary output winding by means of changes in magnetic flux in different ones of a plurality of air gaps as they are brought into and out of proximity with characters of a magnetic medium.

It is also an important object of this invention to provide in a simple and effective manner for rotating a scanning head so as to successively traverse each of a plurality of magnetic circuit elements having air gaps transversely across a tape bearing characters of a magnetic medium, and for applying a magnetomotive force thereto as they pass the characters for the purpose of producing an output signal in accordance with the nature of the character.

It is further proposed to effect high-speed scanning of magnetizable characters on a moving tape or other medium by using a scanning head comprising a plurality of magnetic elements mounted about the periphery of a disc or drum which is rotated in a plane substantially perpendicular to the line of movement of the tape, positioning a stationary core of magnetic material adjacent thereto to introduce flux into oppositely disposed elements at the instant one of them traverses a magnetizable character, and producing a signal in accordance with a differential change in magnetic flux between the oppositely disposed elements.

Other objects of the invention will be pointed out in the following description and claims, and illustrated in the accompanying drawings, which disclose, by way of examples, the principle of the invention and the best mode, which has been contemplated, of applying that principle.

Figure 2:
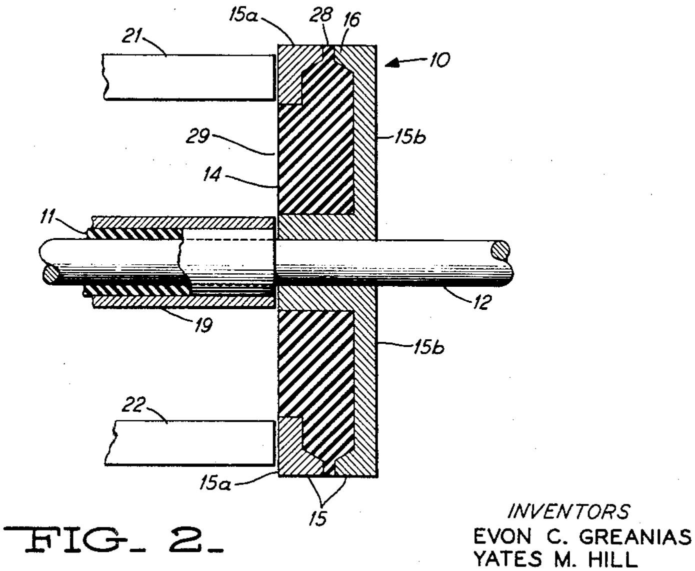
Figure 3:
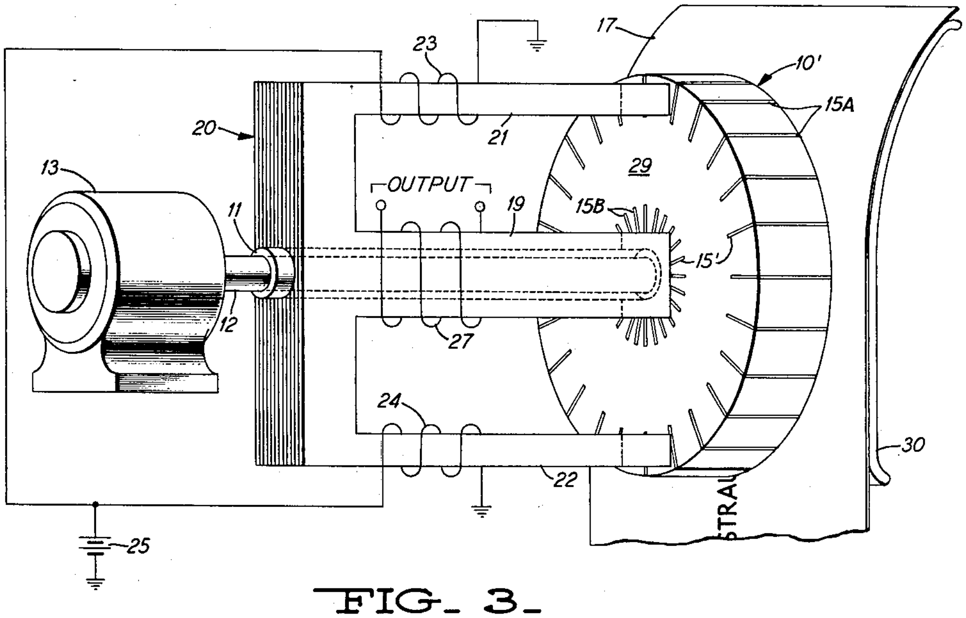
Figure 4:
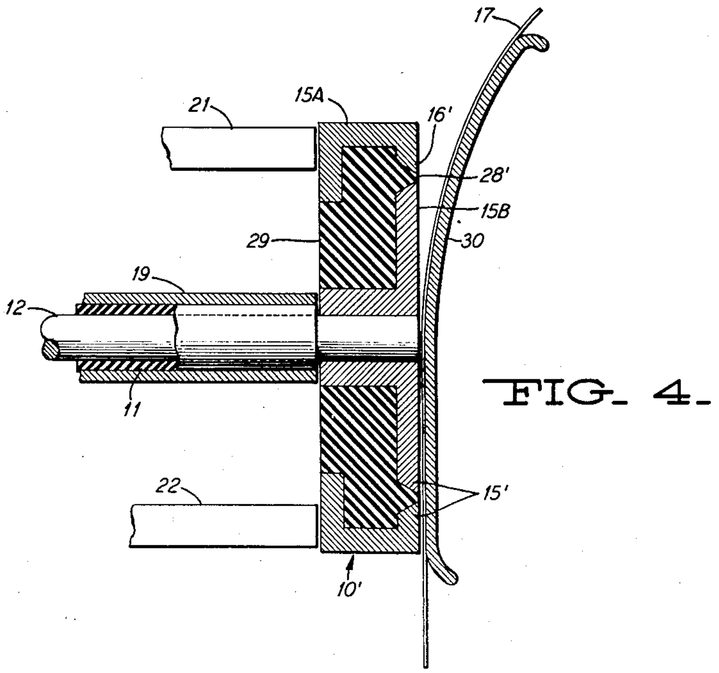
Figure 5:
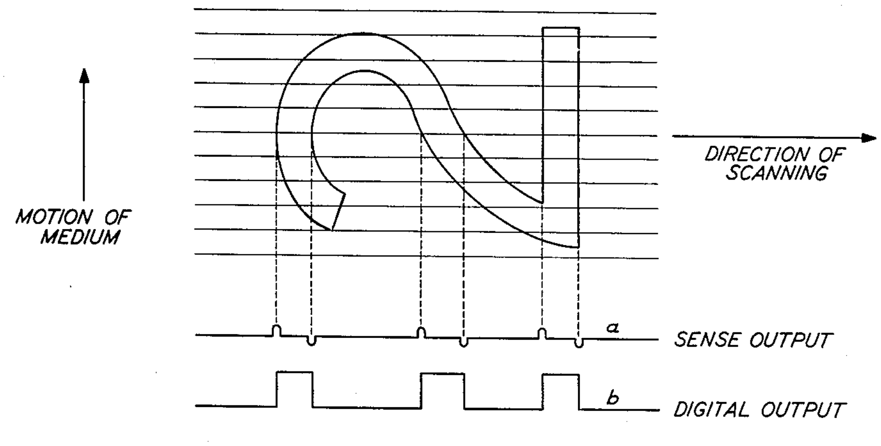
Figure 6:
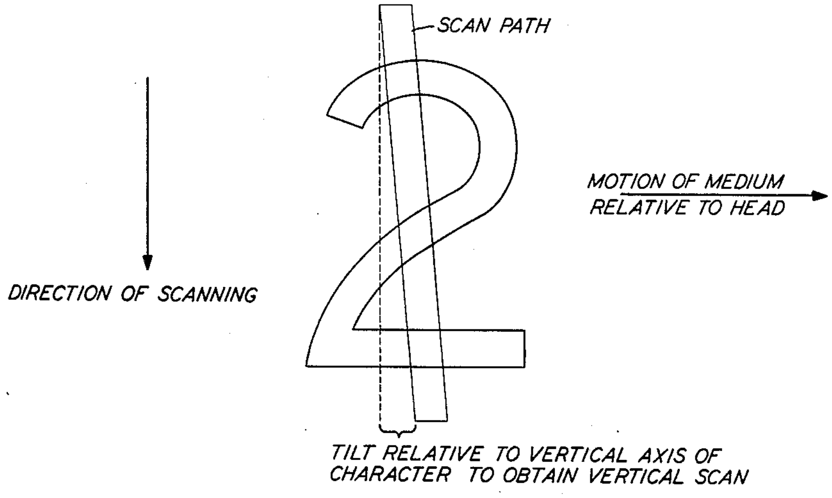
Figure 7:
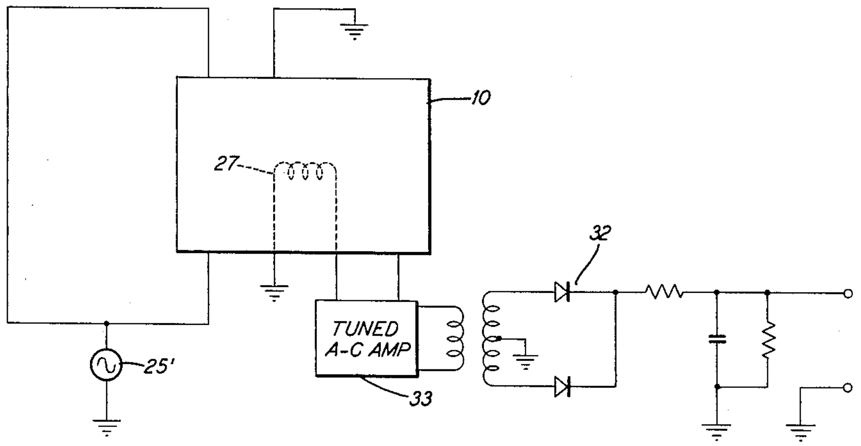
Figure 8:
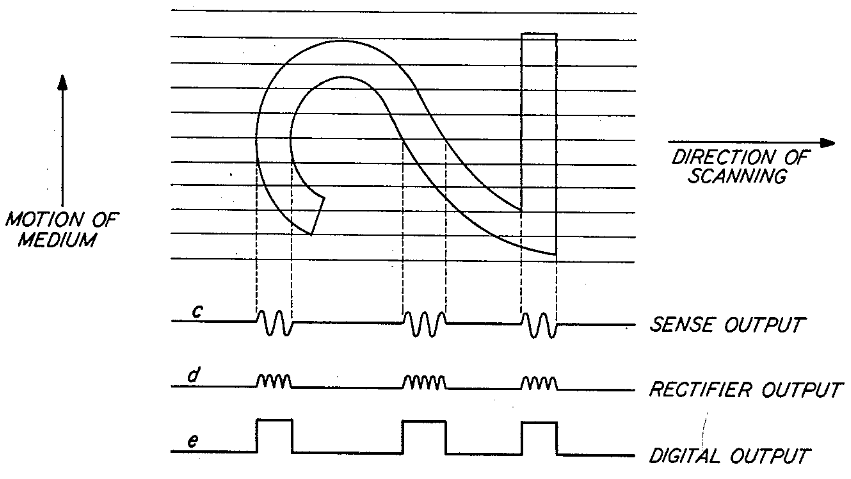

In the drawings:

FIG. 1 is a diagrammatic view of a magnetic scanning head embodying the invention in one of its forms, FIG. 2 is a cross-sectional view taken along the axis of the driving shaft to the rotating head and a portion of the stationary magnetic element, FIG. 3 is a diagrammatic view of a magnetic scanning head embodying the invention in a different form, FIG. 4 is a cross-sectional view through the scanning head of FIG. 3, FIG. 5 shows curves illustrating the output characteristic of the sense winding and the digital output produced therefrom by using a NRZ type amplifier, FIG. 6 is a schematic diagram showing the tilted relationship of the scanning head relative to the characters in order to produce substantially vertical scanning, FIG. 7 is a diagrammatic view of a magnetic scanner embodying the invention in yet another form, and FIG. 8 shows typical output characteristic curves for the scanner of FIG. 7.

Referring to FIG. 1 of the drawings, it will be seen that the magnetic scanning head may comprise generally a rotary head 10 mounted on a shaft 12 which is arranged to be driven by means of a suitable motor 13, and having a plurality of magnetic elements 15 arranged about the periphery of the head for scanning characters of a magnetic material such as, for example, an ink containing particles of magnetic iron oxide, which are disposed on a tape or other medium 17 moving in a direction substantially parallel to the axis of the shaft 12 as indicated by the arrow 18. A stationary magnetic structure 20 is utilized in connection with magnetic elements 15, and comprises a substantially E-shaped laminated core of magnetic material having a central leg 19 and outer legs 21 and 22 disposed adjacent the periphery of the sensing head 10 and provided with windings 23 and 24, respectively, which are connected to a suitable source such as a battery 25 for inducing magnetic flux into oppositely disposed ones of the magnetic elements 15 as they pass the ends of the respective legs. A sense winding 27 is disposed about the central leg 19 of the E-shaped core and is connected to an NRZ (nonreturn to zero) amplifier 26 of a well-known type for producing a digital output signal.

Referring to FIGS. 1 and 2 of the drawings, it will be seen that the magnetic elements 15 may comprise in general a pair of substantially L-shaped cores **15*a* and 15*b* of soft iron, transformer steel or other such magnetic material, secured in opposed relation in a nonmagnetic medium 14 such as, for example, a molded resinous material of one of the well-known types. The element 15*b* is, for example, arranged with its base adjacent the shaft 12 and its vertical leg radially along the outer face of the head 10 and having a projection 16 extending partly across the periphery, while the element 15*a* is oppositely disposed with its base adjacent the periphery of the head and its vertical leg radially along the inner face of the head. The elements 15*b* and 15*a* may be of a major and minor character, respectively, as shown, and so arranged as to provide a relatively small or minor air gap 28 therebetween at the periphery of the rotating head, and a relatively large or major air gap 29 between the elements on the inner side of the scanning head adjacent the stationary magnetic element 20. The stationary magnetic element 20 comprises a plurality of laminations, and may be arranged with the outer legs 21 and 22 adjacent the minor magnetic elements 15*a* at diametrically opposite the points on the periphery of the sensing head 10 and the inner leg 19 adjacent the bases of the corresponding elements 15*b*. The leg 19 accommodates a bearing 11 for the shaft 12**.

It will thus be seen from FIGS. 1 and 2 that a pair of parallel magnetic circuits are provided from the central leg of the E-shaped core through the outer legs, through diametrically oppositely disposed minor magnetic elements **15*a*, across the air gaps 28, and through the corresponding major magnetic elements 15*b*, and thence back to the central leg portion 19 of the stationary magnetic element 20. The windings 23 and 24 are so arranged that flux in the legs 21 and 22 is in opposite directions so that a series magnetic circuit therethrough is provided. The reluctance of the two halves of the circuit will be substantially balanced in the absence of the presence of any magnetizable material adjacent either one of the oppositely disposed air gaps 28 so that no flux passes through the central leg 19. The presence of a character of a magnetizable material adjacent one of the air gaps 28 as the scanning head 10 rotates changes the reluctances of that portion of the magnetic circuit and hence produces a change in the magnetic flux produced in that circuit so that a differential flux occurs in the central leg. This change in the magnetic flux produces an output signal in the sense winding 27 in the nature of a small pip or pulse in one direction as the gap traverses from a nonmagnetic medium onto the leading edge of the magnetic character, and produces a small pip or pulse in the opposite direction as the air gap 28 traverses from the magnetic material onto the nonmagnetic surface at the trailing edge of the character. These pips or pulses applied to the NRZ amplifier 26** are effective to produce digital output signals which are spaced apart in proportion to the width of the magnetizable character traversed by the air gap.

Referring to FIGS. 3 and 4, it will be seen that instead of having the magnetic character bearing medium 17 traverse the periphery of the scanning head 10 as in FIG. 1, a different arrangement may be used if desired, in which the tape or other character bearing medium 17 moves in a direction substantially parallel to the flat outer surface of the scanning head 10′. As best shown in FIG. 4, the character bearing medium 17 traverses across the outer face of the disc 10′, being supported by a curve support 30 so arranged as to bring the medium 17 into close proximity with the face of the scanning head 10′ adjacent the lower edge of the scanning head, while providing a relatively large air gap between the medium and the face of the scanning head adjacent the upper portion thereof.

Instead of having the air gaps about the periphery of the scanning head 10′, they may be arranged in the outer face of the scanning head adjacent the periphery. For example, the magnetic elements 15 of FIG. 1 may be modified so as to provide magnetic elements 15′ having the major magnetic portion thereof 15B with its base adjacent the shaft 12, but having the vertical leg terminating short of the periphery of the scanning head 10′. The minor magnetic element 15A may be arranged in substantially inverse relation, but is provided with a base extending completely across the periphery depending projection 16′ along the outer face of the scanning head 10 and disposed in close proximity to the vertical leg of the major magnetic element 15B so as to provide a minor air gap 28′ in the outer face of the scanning head adjacent the periphery. The major air gap 29 is provided as before adjacent the inner face of the scanning head 10′. The magnetic element 20 is arranged as shown in FIG. 1 with its outer legs 21 and 22 adjacent the minor magnetic elements 15A so as to provide substantially parallel magnetic flux paths between the magnetic element 20 and the magnetic elements 15A and 15B, with the minor air gaps 28′ of diametrically opposed magnetic elements 15′ interposed one in each of the flux paths. Thus when the scanning head 10′ is rotated, characters of a magnetizable material on the tape medium 17 pass in close proximity to the lower air gap 28′ and it effects an unbalance between the two portions of the magnetic circuit and produces a signal in sense winding 27 as described in connection with the apparatus of FIG. 1. The winding 27 is connected to a NRZ amplifier as shown in FIG. 1.

In operation the windings 23 and 24 on the outer legs of the stationary magnetic core 20 are energized from the battery or other source 25 so as to produce magnetic flux in the legs 21 and 22 in series. With no magnetically recorded character adjacent the scanning head, the magnetic flux through the two portions of the circuit including the outer legs 21 and 22, respectively, will be substantially balanced, so that no differential flux exists in the central leg of the E-shaped core. Any change in the reluctance of the magnetic circuits due solely to motion of the magnetic elements as the scanning head 10 rotates and traverses the magnetic elements 15 past the ends of the outer legs 21 and 22, will produce no signal in the sense winding 27, since any such changes will occur in both circuits at the same time and no flux change will occur in the central leg. However, when a magnetically recorded character on the tape medium 17 is traversed by the scanning head 10, the reluctance of the magnetic circuit through the outer leg 22 changes, due to the presence of the magnetizable material, whereas no such change occurs in the magnetic circuit through the outer leg 21. Thus, as the lower air gap 28 traverses the medium 20 and comes into proximity with the magnetizable character, a differential change in the magnetic flux is produced in the central leg of the E-shaped core, and a positive pip or pulse signal is produced in the sense winding 27 as shown by curve *a* in FIG. 5. While the gap 28 is traversing the magnetically recorded character, there will still be an unbalanced flux through the central leg of the E-shaped core, but no further change in magnetic flux occurs during such traverse so the output of the sense winding drops to zero. Subsequently, as the air gap 28 traverses from the magnetically recorded character onto the surface of the medium 17, a reverse change in the magnetic flux through the leg 22 occurs, and a change in flux occurs in the central leg 19, so that a reverse pip or pulse signal is produced in the sense winding 27. These two signals define the edges of that portion of the magnetizable character being scanned. As the air gaps sweep over further portions of the character in their scanning, other positive and negative pips will be produced as shown in FIG. 5. The pulse output of the sense winding 27, as shown by curve *a*, may be applied to a NRZ (nonreturn to zero) amplifier of a type well known in the art for producing digital output signals as represented by the curve *b* of FIG. 5.

Since the medium 17 is traveling in a direction substantially perpendicular to the direction of scanning while being scanned, as shown in FIG. 6, a slight skew effect will be introduced. By tilting the axis of the scanning disc, an amount substantially equal to the movement of the medium while a character is being scanned, as shown, this skew effect can be corrected and the output signals will result in a correct and upright interpretation of the character.

The pulse output from the sense winding 27 may be fed to a NRZ amplifier of a well-known type such as that shown in FIG. 8 of application Serial No. 575,424, of W. S. Rohland et al., filed April 2, 1956, and entitled Apparatus for Analyzing Intelligence Manifestations. The output of the NRZ amplifier may be then connected into the writer amplifier 14 of FIG. 1 of the Rohland et al. Apparatus for Analyzing Intelligence Manifestations. The land et al. application. The scanning head 10 may be coupled to the drum 15 of the aforesaid application by, for example, mounting it on the same shaft in the place of the scanning disc 34, or coupling the shaft 12 to the shaft of the drum 15, the optical elements shown associated with the disc 34 being omitted.

As one example of the invention, a scanning head of approximately 3 inches in diameter and operating at 10,000 r.p.m. may be used. This head carries approximately 38 magnetic elements 15 spaced on the order of ¼ of an inch apart. This arrangement provides 380,000 scans per minute, and based on a desirable figure of approximately 10 scans per character, each character being approximately 1/10 of an inch wide, this gives a linear tape speed of approximately 63 inches per second.

Instead of using a direct current source 25, as shown in FIG. 1, an alternating current source 25' may be used as shown in FIG. 7. The sense winding 27 is connected by an A.-C. amplifier 33 to an R-C detector circuit 34 which comprises a center tapped transformer 35, diodes 36, output resistor 38 and capacitor 39.

As shown in FIG. 8, the sense winding output will now be an alternating current signal during the period of scanning a magnetic character. The frequency of the source 25' should be such as to give at least two full cycles in the narrowest line of interest such as shown by curve *c*. With a head speed of 10,000 r.p.m. 25 gap elements, and a scan zone of ¼ of an inch this would result in a scan rate of approximately 1.5 mils per microsecond. With a minimum line width of about .010 inch, this gives 3.5 microseconds for one cycle, or a frequency on the order of 300 kc. The tuned amplifier 33 should have a band width on the order of 10 to 20 times the scan frequency of 6333 scans per second, or about 60 kc. for the best results. The rectified sense winding signal is shown by the curve *d*, and the digital output envelope signal from the RC circuit is typified by the curve *e*. This signal may be utilized in place of the NRZ amplifier output of the scanner of FIG. 1, as explained in connection with the description thereof hereinbefore.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a scanner, a movable member having a plurality of independent spaced magnetic circuit elements thereon each with individual gaps movable into proximity with a character bearing element having a character thereon which is of separate magnetic material, stationary means for simultaneously applying magnetomotive forces to magnetic circuit elements respectively in and out of proximity with the character bearing element, and output means for producing a signal in response to a change in flux produced in one of said magnetic circuit elements by one of said forces relative to the flux in the other magnetic circuit element.

2. A scanner comprising, a rotatable cylindrical scanning head having a plurality of separate magnetic circuit elements disposed in spaced relation about the periphery thereof, said elements having uniform air gaps adapted to be successively brought into proximity with a character bearing medium having characters of a magnetic material, stationary electromagnetic means disposed on one side of the scanning head for simultaneously applying similar magnetomotive forces to different ones of said magnetic circuit elements in and out of proximity with the character bearing medium to produce magnetic fluxes therein, and sensing means operable in response to the proximity of a character to the gap of an element to produce a signal in accordance with a change in difference between the fluxes in said elements.

3. A scanning device comprising, a rotatable member having a plurality of separate radially disposed magnetic circuit elements each having a uniform gap adjacent the periphery, means for rotating the member to successively bring the gaps into proximity with a character bearing medium having characters of a magnetic material, means including a stationary three-legged core of magnetic material disposed to simultaneously complete separate magnetic circuits with elements having gaps respectively in and out of proximity with the material, separate windings on the outer legs of the core energizable to produce magnetic fluxes in said elements, and a sensing winding on the central leg producing a signal in response to a differential change of flux in the outer legs.

4. A scanner comprising, a rotor of nonmagnetic material having a plurality of pairs of spaced magnetic circuit elements, each pair having a major and a minor gap therebetween, with the minor gap disposed adjacent the periphery of the rotor and arranged to be brought into proximity with a character bearing medium having characters of a magnetic material thereon, electromagnetic means including a stationary core and winding means thereon to simultaneously introduce separate magnetic fluxes across the major gaps of different ones of said elements which are respectively in and out of proximity with said medium, and sensing means operable to produce an output signal in accordance with a differential change of flux in said elements.

5. A scanning device comprising, a rotor, a plurality of peripherally spaced pairs of magnetic elements disposed radially with major and minor gaps extending radially from the center of the rotor and adjacent the periphery respectively, electromagnetic means including a stationary three-legged core arranged on one side thereof and having separate windings on its outer legs to provide a common magnetic circuit across the major gaps of oppositely disposed ones of said magnetic elements through the outer legs thereof, and means including a sensing winding on the middle leg common to said magnetic elements for providing an output signal in response to a change in differential of flux in said elements.

6. In a scanner for a moving character bearing medium having characters of magnetic material, a rotating head having a plurality of radially disposed magnetic circuit elements with both radially and peripherally disposed gaps, said rotor being disposed to bring the peripherally disposed gaps adjacent said characters, a stationary three-legged core of magnetic material having a common centrmal leg and two outer legs arranged to provide magnetic circuits across the radial gaps of diametrically oppositely disposed magnetic circuit elements, input windings on each of the outer legs providing separate serially related magnetomotive forces across the radial gaps of said oppositely disposed elements, and a differential sensing winding on the central leg operable to produce an output signal in accordance with the nature of said character of magnetic material.

7. In a scanning device for a longitudinally moving tape having indicia thereon of a magnetic material, a stationary E-shaped core of magnetic material having windings on the outer legs to produce separate serially related magnetic fluxes therein and a rotatable shaft coaxial with the middle leg, a differential sense winding on the middle leg, and a rotor on the shaft having a plurality of pairs of members of magnetic material disposed in opposed spaced radial relation to provide magnetic shunts between the middle and outer legs, each pair of members having a peripheral air gap disposed to pass transversely of the tape in close proximity thereto.

8. A scanner for a longitudinally moving web having indicia thereon of a magnetic material comprising, a scanning head rotatable about an axis substantially parallel to the direction of movement of said web, said head having a plurality of pairs of members of magnetic material radially disposed thereupon to provide predetermined peripheral gaps in an axial direction which are moved transversely of the web so as to be brought into and out of proximity with the indicia on the web as the head rotates and having radial gaps therein on one side of the rotor, electromagnetic means including a stationary E-shaped core of magnetic material disposed on said one side of the head with the outer legs and central leg bridging different ones of the radial gaps to provide with different ones of the pairs of members series related magnetic paths, windings on said outer legs for applying substantially equal serially related magnetomotive forces to said paths, and a differential sensing winding disposed on the middle leg.

9. In a scanner for characters of a magnetic material on a longitudinally movable tape, a rotor of nonmagnetic material having one face tangentially disposed relative to a portion of the tape, a plurality of pairs of members of magnetic material radially disposed on the rotor, each pair of said members having a major gap therebetween in the face remote from the tape, and having a minor gap in the face adjacent the tape, electromagnetic means including a stationary magnetic core structure disposed across the major gaps of oppositely disposed of said pairs of members to provide flux paths therethrough, separate windings thereon to produce magnetic flux in said members and the minor gaps, and a differential winding on said core common to said paths.

References Cited in the file of this patent

UNITED STATES PATENTS

| | | |
|---|---|---|
| 2,352,023 | Schuller | June 20, 1944 |
| 2,539,876 | Von Behren | Jan. 30, 1951 |
| 2,602,660 | Shannon | July 8, 1952 |
| 2,831,180 | Hasbrouck | Apr. 15, 1958 |
| 2,909,616 | Marty | Oct. 20, 1959 |

FOREIGN PATENTS

| | | |
|---|---|---|
| 1,107,292 | France | Sept. 2, 1953 |
| 760,874 | Great Britain | Nov. 7, 1956 |